(No Model.)
J. M. HOLLER.
WAGON RUNNING GEAR.
No. 472,295. Patented Apr. 5, 1892.
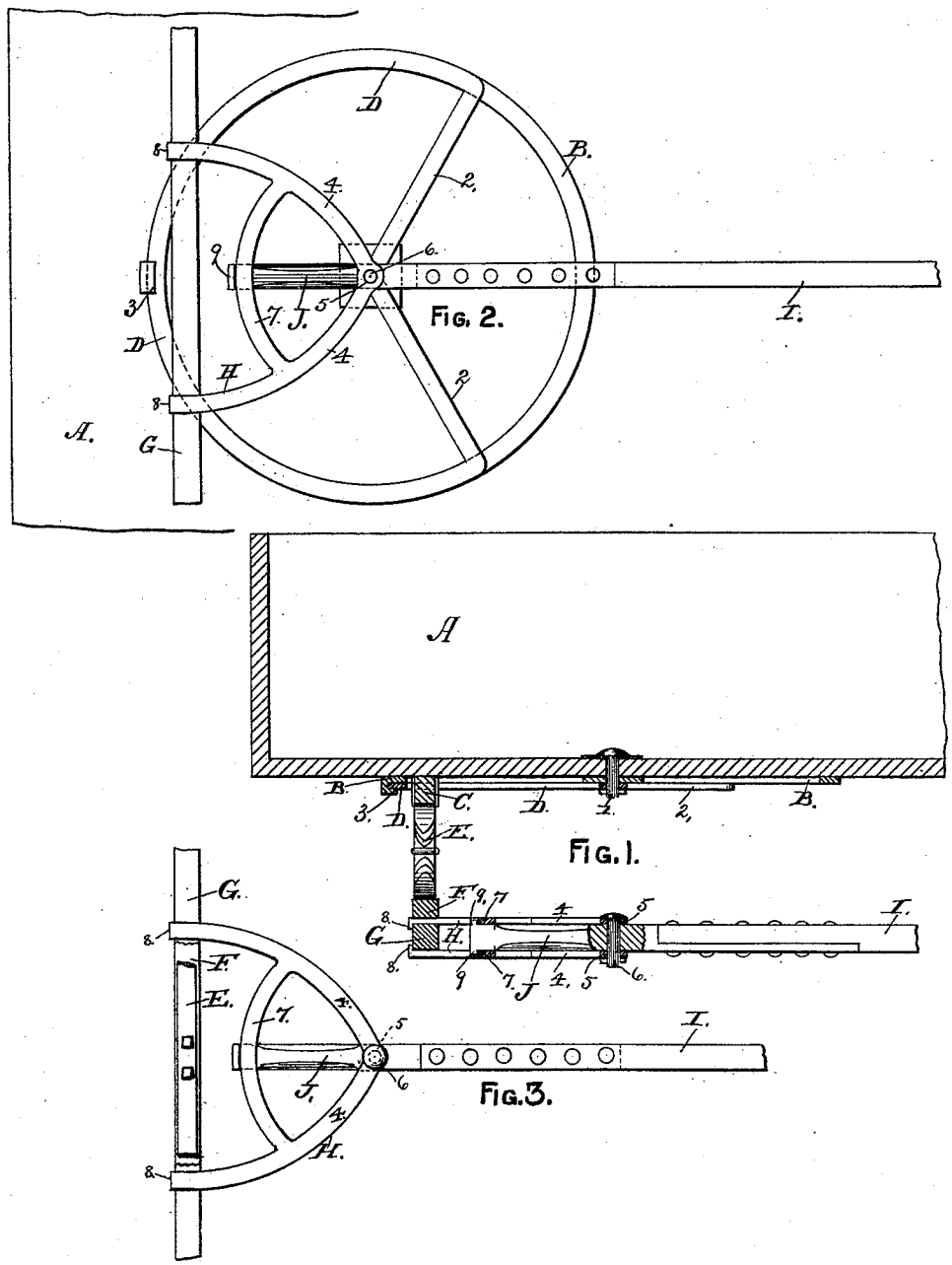
WITNESSES:
INVNNTOR:
JOHN M. HOLLER,
BY
ATTORNEY.

UNITED STATES PATENT OFFICE.

JOHN M. HOLLER, OF ALBANY, NEW YORK.

WAGON RUNNING-GEAR.

SPECIFICATION forming part of Letters Patent No. 472,295, dated April 5, 1892.

Application filed September 22, 1891. Serial No. 406,444. (No model.)

*To all whom it may concern:*

Be it known that I, JOHN M. HOLLER, of the city and county of Albany, in the State of New York, have invented new and useful Improvements in the Running-Gears of Wagons and other Vehicles, of which the following is a specification.

My invention relates to improvements in running-gears of wagons, carriages, and other four-wheeled vehicles; and the object of my invention is to provide facilities for turning vehicles in a very limited space and to avoid the dangers incident to accidents arising from the breaking of "king-bolts." This object I attain by the mechanism illustrated in the accompanying drawings, which, being herein referred to, form part of this specification, and in which—

Figure 1 is a longitudinal section of the forward portion of a box-wagon, the spring and part of the reach being shown in side elevation. Fig. 2 is an inverted plan view of the same, portions of the box, reach, forward axle, and the forward wheels being removed therefrom; and Fig. 3 is a plan view of part of the reach and forward axle, showing the mode of connecting the reach with the forward axle.

As represented in the drawings, A designates the box of a wagon, which may be made of any required size and form and of which only the foremost portion is shown in the drawings. A metallic circle B is secured to the under side of said box, and a pivot 1 passes through the bottom of said box in a central position to said circle.

C designates a spring-bar, which, unlike similar parts of a wagon, is unattached to the box, so as to leave the latter free to swing on the pivot 1. Attached to said spring-bar there is a metallic segment D, corresponding to the circle B and provided with arms 2, which radiate from the central point of said segment. The pivot 1 is fitted to enter an opening at the intersection of said arms and forms a center on which the segment D will swing in a lateral direction. A hook 3 is formed on the circle B at its foremost edge, and said hook engages with the segment D to relieve the pivot 1 from the strain of drawing the wagon.

E designates the spring, which is secured to the spring-bar C in the usual manner, and said spring may be of the common form of elliptical spring or of any other form suitable for the purpose; but said spring may be dispensed with, as hereinafter explained. The lower part of the spring E is secured to a bed-piece F, which is secured to a metallic forward axle G, on which the forward wheels of the wagon are fitted to revolve in the usual manner.

H designates a yoke or bracket, preferably formed of two like parts, of which one part is secured at the middle of the axle G on the upper side of the latter, and the other part is secured in a corresponding position to the under side of said axle. Each part of said bracket is composed of arms 4, arranged in the form of an arch which has at its apex an opening 5 for receiving a pivot 6, whose position should correspond to that of the pivot 1, and each of said parts should be provided with an arc 7, which is concentric to the center of the pivot 6. The yoke or bracket H extends rearwardly from the axle G, and each of its parts is provided with lugs 8 at the foremost end for the purpose of engaging with the forward side of the axle G, so as to afford secure hold for said bracket on the axle G.

I designates the reach which connects the forward axle G through the bracket H to the rearmost axle of the wagon. The foremost end of said reach has no direct connection with the bed-piece F after the manner of the usual construction; but it is provided with a metallic head J, provided with lugs 9, fitted to engage with the arcs 7 of the bracket H. The head J is also provided with an opening for receiving the pivot 6, which passes through both parts of the bracket H and the head J, so as to form a center upon which the axle G can swing toward either side of the center line of the wagon for the purpose of moving the wagon from a direct line.

When preferred, the spring E or its substitute may be dispensed with, and in such cases the spring-bar C can also be admitted by securing the segment D to the upper side of the bed-piece F.

It will be seen that my invention differs from the usual construction of running-gears for vehicles by having its pivotal center carried behind the forward axle instead of having said center arranged in the middle of the center line of the forward axle, and thereby I am enabled to effect the turning about of a wagon in a much shorter space than it can usually be accomplished in. It also differs from the usual constructions by dispensing with the connection of the reach I with the bed-piece F, the connection of said reach with the forward axle G being made at a considerable distance to the rearward of the forward axle, whereby the turning of the vehicle in a very short space is greatly facilitated.

By means of my improvements I am enabled to use wheels of large diameter and of equal size on both axles of the vehicle and to effect a deflection of the foremost wheels laterally, so as to turn the vehicle in a very limited space.

I am aware that running-gears for vehicles have heretofore been constructed with reaches which were pivoted rearwardly of the forward axle, and therefore I do not broadly claim such a construction; but

What I claim as my invention, and desire to secure by Letters Patent, is—

1. In a vehicle running-gear, the combination of a forward axle having a rearwardly-extending bracket secured thereto, said bracket having a circular pivot-hole formed near its rearmost extremity and also having an arc that is formed concentrically to said pivot-hole, a reach having no direct connection with said forward axle, but having a head on its foremost end, which is fitted to engage with said arc, as herein described, said head having a pivot-hole which corresponds to the pivot-hole of said bracket, and an immovable pivot fitted to engage in the pivot-holes of said bracket and reach-head, said arc, pivot-holes, and pivot being all arranged rearwardly in respect to the aftermost side of said forward axle, as and for the purpose herein specified.

2. The combination of a wagon-body provided with a metallic circle secured to its under side and having a pivot-hole centralized in said circle, a segment corresponding to said circle and secured to the spring-bar of the forward axle, said segment having a pivot-hole corresponding to the pivot-hole of the wagon-body, a forward axle provided with a rearwardly-extended bracket having a pivot-hole near its rearmost extremity arranged to correspond to the pivot-hole in the wagon-body and having an arc which is concentric to said pivot-holes, a reach provided with a metallic head which is fitted to engage with said arc, said head also having a pivot-hole that corresponds to the pivot-hole of said bracket, and a pivot fitted to engage in said pivot-holes, as and for the purpose herein specified.

JOHN M. HOLLER.

Witnesses:
WM. H. LOW,
S. B. BREWER.